Sept. 27, 1927.
C. T. RAY
TILLAGE IMPLEMENT
Filed Sept. 6, 1921
1,643,519
2 Sheets-Sheet 1
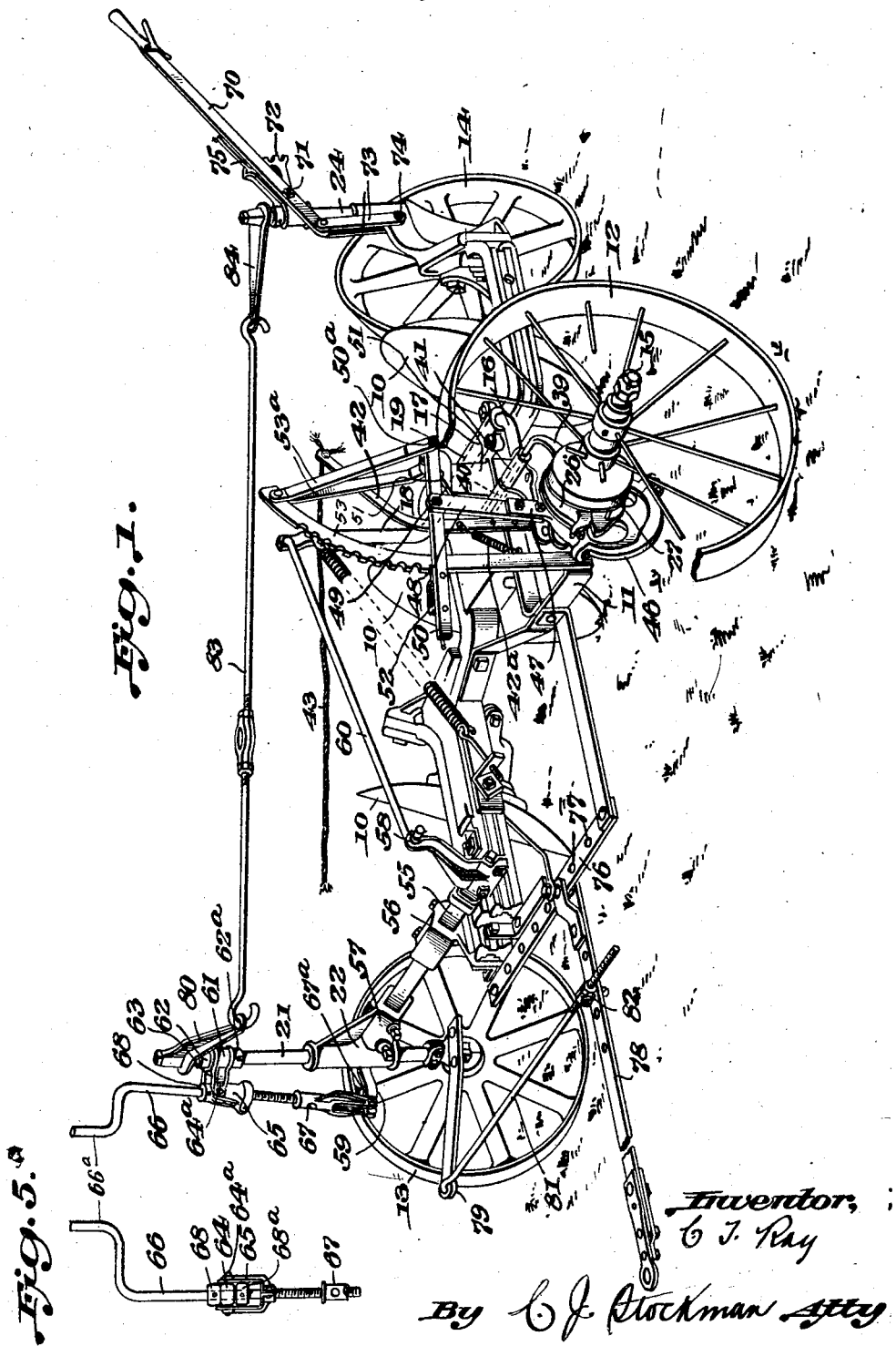

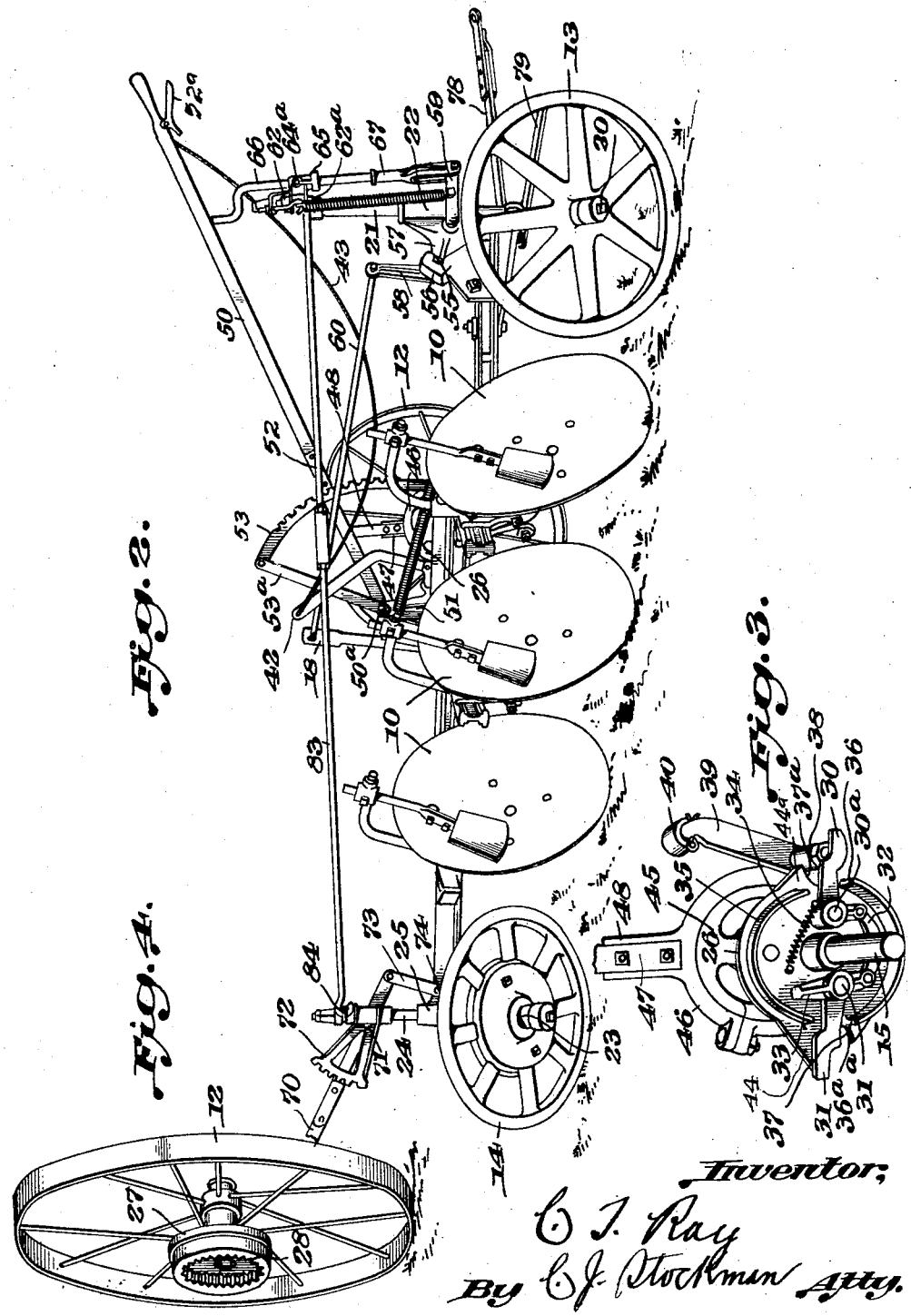

Patented Sept. 27, 1927.

1,643,519

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

TILLAGE IMPLEMENT.

Application filed September 6, 1921. Serial No. 498,695.

This invention has relation to an implement in which the soil working member or members (herein illustrated for exemplary purposes as a gang of plow bodies of the disk type) are raised or lowered from or into working positions by power derived from the rotation of one of the supporting wheels of the implement. As here illustrated the implement includes front and rear furrow wheels mounted on spindles which are rotatable about vertical axes and are connected with each other to provide for maximum flexibility with respect to the guidance of the implement and also are movable up and down with relation to the frame, and the land wheel is mounted on a crank axle to which the power to raise and lower the frame is applied and from which it is transmitted to the spindle carrying one of the furrow wheels to thereby produce relative up or down movement of said spindle and the frame and soil working member or members.

One of the important purposes of the invention is to so combine and correlate the supporting wheels and appurtenant parts that the power to raise and lower the frame and soil working members may be derived from the travel of the implement without lessening the guiding effect obtainable from the mounting of the furrow wheels on vertical spindles. Other important purposes are to provide a tillage implement in which: (1) the frame may be leveled by means connected to the rear furrow wheel; and (2) an improved means is provided to adjust the front furrow wheel in accordance with the depth of furrow to be produced.

A further important purpose of the invention is to provide various novel combinations and correlations of parts whereby the foregoing purposes may be severally accomplished by means which are characterized by simplicity of construction, durability, the ease with which they may be operated and their effectiveness in the accomplishment of the various adjustments and movements which they are intended to effect.

In the accompanying drawings, I have illustrated an implement having three ground working members in the form of soil turning disks but this is merely exemplary as the invention may be embodied in an implement having any suitable number or kind of ground working members.

In the accompanying drawings illustrating the preferred embodiment of the invention and wherein like characters of reference denote corresponding parts in the several figures—

Fig. 1 is a perspective view of the implement viewed from one side.

Fig. 2 is a side elevation viewed from the opposite side.

Fig. 3 is a detail perspective view more particularly intended to show a form of clutch mechanism which may be employed to attach the land wheel to its axle spindle and to permit it to run free on said spindle, at will.

Fig. 4 is a detail view of said wheel showing a member of the clutch thereon and Fig. 5 is a detail view showing a part of the means for raising and lowering the forward axle spindle, and particularly intended to make clear its connection with said spindle.

The ground working members herein illustrated as disks 10, are connected in any suitable manner to a frame 11 which may be of any appropriate construction. In practice it is preferred to connect these members to the frame in a manner which will permit them to be readily removed, individually, and to be adjusted bodily transversely with relation to the implement and pivotally, whereby their number may be varied and their distance from the line of draft and set may be changed in accord with varying soil conditions.

The frame and ground working members are carried by a land wheel 12, a forward furrow wheel 13 and a rear furrow wheel 14. The land wheel 12 is mounted for rotation on the spindle portion 15 of an axle which includes, in addition to said spindle portion, a rearwardly extending crank arm 16 and a transverse member 17. The member 17 extends across the frame from the rear end of the crank arm 16 and is journaled in a bearing 19 carried by the frame. At its end opposite the crank arm 16, the member 17 is provided with a crank arm 18 for a purpose which will hereinafter appear.

The forward furrow wheel 13 is rotatably mounted on the downwardly and outwardly inclined lower end 20 of a vertical shaft 21 which is journaled in a bearing 22 carried by the frame; and the rear furrow wheel 14 similarly is rotatably mounted on the downwardly and outwardly inclined lower end 23 of a vertical shaft 24 which is journaled in a bearing 25 carried by the frame.

A power lift mechanism of suitable construction has connection with the land wheel and with the land wheel axle and the frame to impart, at will, oscillatory movement to the land wheel axle—in one direction in the raising of the ground working members from ground working position and in the opposite direction in lowering said members to ground working position—by power derived from the rotation of the land wheel, and the connections include a lever 50 which is settable selectively into any one of a number of positions, in which it may be latched to a toothed segment 53. This lever extends forwardly to within convenient reach of the operator on the tractor (not shown) employed to draw the implement, and is operated to vary the angle to which the crank portion 16 of the land wheel axle is set with reference to the frame and ground in accordance with the depth of furrow intended to be made. The particular power lift mechanism which I prefer will be hereinafter set forth in detail but is not herein claimed since the same has been illustrated, described and claimed in a previous application filed by me in the United States Patent Office on the 15th day of December, 1919, and numbered, serially, 344,962.

Power is transmitted from the axle of the land wheel 12 to the vertical shaft 21 of the forward furrow wheel in the operation of raising or lowering the frame and soil working members from and into working position through the following connections:

The bearing 22 in which the shaft 21 of the forward furrow wheel is journaled, is sustained in the illustrated offset position with relation to the front end of the frame, by a member 55 which is clamped to the frame at 56 and secured to the bearing 22 at 57. Crank arms 58 and 59 are connected with each other through the medium of a rock shaft which preferably extends through the member 55, the latter being made hollow for this purpose. These crank arms are disposed approximately at right angles with each other. The arm 58 is connected by a link 60 with the crank arm 18 projecting from the inner end of the land wheel axle. The crank 59 is connected with the vertical shaft 21 through a means which is characterized by being substantially fixed to said shaft against relative movement in an up and down direction but permits relative rotative movement i. e. rotative movement of the shaft on a vertical axis in the guiding of the implement. The particular connection between the crank 59 and the shaft 21 illustrated in the accompanying drawing and presently described in detail is further characterized in that it permits substantially vertical adjustment of the front furrow wheel relatively to the frame and land wheel in accordance with the predetermined depth of plowing which it will be remembered is variably regulated primarily by adjustment of the lever 50. This particular connection is as follows:

Mounted upon the shaft 21 is a sleeve 61 in which the shaft is free to rotate. This sleeve is arranged between collars 62 and 62$^a$ which are fixed to the shaft, so that up and down movement of the sleeve is transmitted to the shaft. The sleeve 61 is formed as a member of a bracket having arms 63 which project forwardly from the sleeve and are provided at their forward ends with a trunnion 64 which is pivotally connected at 64$^a$ to said arms and also to the side walls of a hollow member 65. A rod 66 having a handle 66$^a$ at its upper end extends through the trunnion 64 and also through the member 65 and has its lower end threadably connected to the upper end of a yoke shaped or bifurcated member 67 whose arms are pivoted at 67$^a$ to the forward end of the crank 59. A pair of collars 68 and 68$^a$ fixed to the rod 66 immediately above and below the trunnion 64 cause movement of the rod 66 in an up or down direction to be transmitted to the trunnion and from said trunnion to the spindle 21 through the members 63, sleeve 61 and collars 62, 62$^a$. It will be noted that the rod 66 may be adjusted up or down and fixed in adjusted position, by screwing it by hand up or down with relation to the member 67 and that in this movement the rod and the shaft are raised or lowered relatively to the member 67, frame 11, land wheel 12, rear furrow wheel 14, and mechanism connecting the land wheel axle with the member 67, whereby as already suggested the forward furrow wheel may be adjustably set for various depths of plowing. It will also be noted that the rod 66 may also be moved up or down by power derived from the forward movement of the implement and transmitted to said rod through the crank 18 of the land wheel, link 60, cranks 58 and 59 and the shaft carrying said cranks, and that in this movement the land wheel, forward furrow wheel and operating connections between said wheels move simultaneously and relatively to the frame and plow disks, thereby causing the latter to be lowered from transport to working position, or raised from working to transport position, as the case may be.

70 designates a leveling lever pivoted at 71 to a quadrant 72 and having its forward end connected by parallel links 73 to the frame 11, at 74. Upward or downward movement of the outer end of this lever obviously lowers or raises the rear end of the frame. A latch 75 co-operates with the quadrant to hold the lever and rear end of the frame in any one of a number of selected positions of adjustment.

The illustrated embodiment of the power lift mechanism hereinbefore referred to comprises a clutch whose driven member 26 is rotatably mounted on the spindle portion 15 of the land wheel axle and whose driving member 27 also is rotatable on said spindle portion and is directly secured to the land wheel 12. As here shown the driving member 27 is of hub like form and has a series of internal teeth 28 arranged concentrically about the spindle 15. Operator-controlled means to lock the driven member to the driving member, including elements whereby said members are automatically released from each other when the land wheel has made a partial revolution, are provided. The locking and releasing means preferably comprises two crank shaped members having outwardly extending arms 30, 31, respectively pivoted at their inner ends within the member 26. The pivots are marked 30$^a$, 31$^a$ and are on opposite sides of the spindle 15 and the members are connected with each other by a link 32 whose opposite ends are pivoted to the shorter arms of the members. The arm 31 has a lateral projection 33 forming a pawl to engage the teeth 28 in the driving member. A spring 34 is provided to urge the arms to the positions they occupy when the pawl 33 is engaged with the teeth 28. The casing of the driven member 26 is provided with a circumferential flange 35 formed at the places marked 36, 36$^a$ with oppositely disposed openings through which the arms 30, 31 extend. This member is also formed, adjacent the openings, with outwardly projecting portions having recesses 37, 37$^a$. Either recess 37, 37$^a$ is adapted to receive a projection 38 extending from a trip latch 39. This trip latch has a member 40 which extends in a transverse direction with relation to the implement and is journaled in a sleeve 41 carried by the crank portion 16 of the axle. A lever 42 connected to the member 40 and provided with a rope or cord 43 extending to within convenient reach of the operator on the tractor, not shown, constitutes a suitable means by which the latch 39 may be manually operated to disengage its projection 38 from the adjacent arm 30 or 31. It will be understood that the projection 38 is normally engaged with one of said arms and holds the pawl 33 normally out of engagement with the teeth 28 and that when it is desired to utilize the power means for lifting the disks 10 to transport position or for lowering them to working position, the operator on the tractor pulls upon the cord 43, thereby moving the latch 39 and disengaging the projection 38 from the adjacent arm 30 or 31, whereupon the spring 34 becomes operative to engage the pawl 33 with a tooth of the driving member 27 thereby locking the driven member 26 to the driving member and hence to the land wheel 12. As soon as this has been done the operator releases the cord 43 whereupon the lever 42 and the trip latch 39 are returned to their former positions by a spring 42$^a$. The forward motion of the wheel 12 now causes the driven member 26 to turn in the direction of the arrow, Fig. 3, one half revolution, near the end of which movement the outwardly projecting end of the arm 31 (assuming that the disks were in transport position and are to be lowered to working position, in which case arm 30 is the one which was released at the beginning of the operation) comes into engagement with the projection 38 and is held thereby, a slight further movement of the member 26 bringing its recess 37$^a$ into full registration with the projection 38, whereupon the projection becomes fully seated in the recess. It should be understood that when arm 30 was released, spring 34 became operative to force pawl 33 into engagement with a tooth of the driving member of the clutch and during its operation also imparted movement to the arms 30, 31, so that they extend across the openings 37 and hence are engaged with the projection 38 and are pressed back before said projection becomes seated. During this slight further movement, the pawl 33 is withdrawn from its engagement with the teeth 38 and the spring 34 is placed under tension. It will be noted that the projection 38 rides upon the edge of the member 26 when the latter is rotating and that said edge is formed with high parts 44, 44$^a$ on opposite sides of each opening 36, 36$^a$ and that the outer end of each arm 30, 31 is somewhat offset, to expedite the operation of disengaging the pawl from the driving member.

When the ground working members are in working position the latch projection 38 will be in the recess 37$^a$ and in engagement with the arm 31. When the frame and ground working members are to be raised to transport position, the operator again pulls upon the cord, thereby disengaging projection 38 from arm 31, allowing the spring 34 again to engage pawl 33 with teeth 28, whereby clutch member 26 will again turn one-half of a revolution, at the end of which movement projection 38 will engage arm 30, (thus disengaging pawl 33 from said teeth) and will finally be seated in recess 37 and act to hold the pawl out of engagement with the teeth.

Each half-revolution of the member 26 imparts movement to the frame and ground working members in an upward or downward direction, through the following connections:

Suitably fixed to the driven member 26 is an eccentric 45 which turns about the axle spindle 15 within an eccentric strap 46 having a projection 47 to which is attached the lower end of an arm 48 whose upper end is pivoted at 49 to the adjusting lever 50 hereinbefore referred to. The rear end of this lever is pivoted at 50ª to a bracket 51 which is suitably secured to the frame 11. It is provided with a latch 52 to engage any one of the teeth of the before mentioned segment 53, whose lower end is suitably secured to the frame 11. This segment is braced by rear members 53ª whose lower ends are secured to the bracket 51. The latch 52 in practice is provided with a suitable operating handle 52ª convenient to the operator for releasing it from the segment. Thus, the lever may be manually adjusted to and fixed in, any one of various selected positions. These adjustments of the lever vary the angle to which the crank portion 16 of the land wheel axle is set with reference to the frame and ground. It will be noted that in this manual adjustment the eccentric 45, strap 46 and arm 48 move as a unit about the axis 50ª of the lever and that the land wheel axle swings in its bearing in the frame, the direction of its swinging movement being in accord with the direction of movement given the lever 50. The clutch members are disengaged from each other and the wheel is free on the axle spindle, during this adjusting operation, whose purpose is to regulate the depth of penetration of the ground working members 10. But in the operation of raising or lowering the implement into and from transport position by power derived from the forward travel of the implement, the lever 50 substantially forms a fixed part of the frame, the eccentric 45 rotates with the wheel 12 and within the eccentric strap 46 and said strap and the arm 48 turn about the pivot 49. It will be understood that the high part of the eccentric 45 will be upward when the parts are in transport position and downward when they are in working position and that during the rotative movement of the eccentric from one position to the other it exerts force upon the axle spindle 15 and turns the axle portion 17 in its bearing— the arm 48 and strap 46 in this movement swinging about the pivot 49, as already stated.

The illustrated draft means and guiding means now to be described are not particularly herein claimed in view of a requirement of division made by the Examiner. The said means is as follows:—

The forward end of the frame has a transverse bar 76 provided with a series of openings 77 through any one of which the rear end of a draft bar 78 may be connected. The lower end of the shaft 21 is provided with a crank 79 and the upper end of said shaft is similarly provided with a crank 80. These two cranks are arranged approximately at right angles with each other. The crank 79 is connected with the draft bar 78 by a rod 81 having a portion threaded in a nut 82 trunnioned upon the draft bar. The upper crank, 80, is connected by a link 83 with a crank 84 fixed to the upper end of the shaft 24 of the rear furrow wheel, 14. This provides a guiding mechanism which transmits guiding movement from the draft bar to the forward and rear furrow wheels and permits lateral adjustment of the draft bar to accommodate different hitching points on different tractors.

When the frame and disks are in transport position, the parts are arranged as follows: The lower surfaces of the wheels are in the same horizontal plane, the frame is substantially horizontal, the levers 50 and 70 are substantially horizontal, the disks are elevated above the ground and the eccentric 45 has its eccentric portion up. The depth of plowing having been determined and the adjustment therefor made by raising the free end of the lever 50 and fixing the lever at the desired point and by turning the rod 66 the required amount: the operator now raises the rear end of lever 70 thereby lowering the rear end of the frame to working position. Forward movement is then imparted to the implement and the operator upon the tractor pulls upon the cord 43 thus disengaging the projection 38 carried by the latch 39 from the arm 30 and causing the driven member 26 of the clutch to be locked to the land wheel 12 in the manner hereinbefore explained. This causes the land wheel 12 to move forward relatively to the frame and the land wheel axle to descend and to turn in its bearing upon the frame and through the described connection of said axle with the shaft of the forward furrow wheel to exert pressure in an upward direction upon the shaft 21. During this operation the frame and plow disks are lowered from transport to working position, and at the end of the movement the high part of the cam (the latter having turned one-half of a revolution) will be in its lower position and the driven member 26 of the clutch will have been automatically released from the driving member, in the manner already explained. When, now, it is desired to raise the frame and plow disks from working position to transport position, the operator again pulls upon the cord 43, thus causing the driven member of the clutch again to be locked to the driving member thereof and to make a partial revolution before it is automatically released, during which partial revolution, the land wheel axle is swung in its bearing toward the rear end of the implement, the land wheel moves backward and one side of the frame is lifted, the movement of the land wheel axle causing its crank 18 to move forward and impart downward pressure to the shaft 21. The frame thus lifted to transport position may now be leveled by moving the rear end of the lever 70 downward.

I would have it understood that while I have set forth minutely a particular embodiment of my invention yet this embodiment is merely exemplary and that the invention may be otherwise and variously embodied without departing from its spirit or the scope of the appended claims.

Having described my invention what I claim is:

1. A tillage implement including a frame provided with a ground working element, a crank axle journaled to the frame, front and rear shafts each mounted for rotative movement and for movement in an up and down direction, relatively to the frame, a land wheel supporting the crank axle, front and rear furrow wheels supporting the front and rear shafts, respectively, means to cause simultaneous rotative movement of both shafts in the guidance of the implement, power means operative at will to rock the crank shaft and raise or lower the front shaft, relatively to the frame and rear shaft and furrow wheel, by power derived from travel of the land wheel, and an independent lever mechanism to raise or lower said rear shaft.

2. A tillage implement having land and furrow wheels and soil working elements, the furrow wheel being mounted for steering movement and having a mounting provided with an upright shaft, land wheel actuable means for raising and lowering said elements and including a crank arm, a clamp swiveled to the shaft and a pitman connection between the clamp and said crank arm.

3. A tillage implement having frame carried soil working elements, a land wheel and front and rear furrow wheels and movable mountings for the same, of which that for the land wheel includes a crank axle and those for the furrow wheels include upright steering shafts connected for cooperative movement, means actuable by the land wheel for shifting the land and forward furrow wheel mountings to dispose the soil working elements selectively in working and transport positions, and humanly actuable means for correspondingly adjusting the rear furrow wheel mounting.

4. A tillage implement having frame carried soil working elements, a land wheel and front and rear furrow wheels and movable mountings for the same, of which that for the land wheel includes a crank axle and those for the furrow wheels include upright steering shafts connected for cooperative movement, means actuable by the land wheel to simultaneously shift the land and forward furrow wheel mountings to dispose the soil working elements selectively in working and transport positions, said means including elements to permit relative adjustment of the land and forward furrow wheel mountings, and humanly actuable means for correspondingly adjusting the rear furrow wheel mounting.

5. A tillage implement having frame carried soil working elements, a land wheel and front and rear furrow wheels and movable mountings for the same, of which that for the land wheel includes a crank axle and those for the furrow wheels include upright steering shafts connected for cooperative movement, means actuable by the land wheel to simultaneously shift the land and forward furrow wheel mountings to dispose the soil working elements selectively in working and transport positions, said means including elements to permit independent adjustment of both the land wheel and forward furrow wheel mountings and humanly actuable means for correspondingly adjusting the rear furrow wheel mounting.

6. In a tillage implement, a frame, tillage elements supported thereby, supporting wheels, and means co-operating with said wheels to change the elevation of the frame and to support it in its different elevations, including a shaft upon which one of the wheels is mounted and which is rotative about a substantially vertical axis and movable up and down, relatively to the frame, a longitudinally extensible member and connections between one part of said member and the shaft, permitting relative rotative but not relative longitudinal movements of said part and shaft.

7. In a tillage implement, a frame, tillage elements supported thereby, supporting wheels, and means co-operating with said wheels to change the elevation of the frame and to support it in its different elevations, including a shaft upon which one of the wheels is mounted and which is rotative about a substantially vertical axis and movable up and down, relatively to the frame, an element pivotally connected to said shaft but held against movement longitudinally thereof, said member projecting from the shaft, a trunnion at the outer end of said element, a second element, to which the trunnion is pivoted, and adjustably connected parts, one of which extends through said second element and trunnion and is mounted to have rotative movement therein and longitudinal movement therewith.

8. In a tillage implement, a frame, tillage elements supported thereby, supporting wheels, and means co-operating with said wheels to change the elevation of the frame and to support it in its different elevations, including a shaft upon which one of the wheels is mounted and which is rotative about a substantially vertical axis and movable up and down, relatively to the frame, an element pivotally connected to said shaft but held against movement longitudinally thereof, said element projecting from the shaft, a trunnion at the outer end of said element, a second element, to which the trunnion is pivoted, and parts having confronting ends threadably engaged with each other, said parts forming a longitudinally adjustable rod, one part of which extends through said second element and trunnion and is mounted to have rotative movement therein and longitudinal movement therewith.

9. In a tillage implement, a supporting wheel, a longitudinally movable shaft carried by said wheel, a crank arm, a longitudinally extensible shaft-adjusting means whose lower portion is pivoted to said crank arm and whose upper portion is connected to said shaft, a second crank arm, extending at an angle to the first-mentioned crank arm and moved unitarily therewith, a second supporting wheel, an axle carried by the second supporting wheel and provided with a crank arm, and a link connection between the last named crank arm and said second crank arm.

10. In a tillage implement, a supporting wheel, a longitudinally movable shaft carried by said wheel, a crank arm, a longitudinally extensible shaft-adjusting means, provided with means pivotally connecting it, at different places in its length, with said crank arm and with said shaft, respectively, a second crank arm, extending at an angle to the first mentioned crank arm and moved unitarily therewith, a second supporting wheel, an axle carried by the second supporting wheel and provided with a crank arm, and a link connection between the last named crank arm and said second crank arm.

11. In a tillage implement, a supporting wheel, a longitudinally movable shaft carried by said wheel, a longitudinally extensible member comprising two relatively adjustable parts, one of which is connected to said shaft, the connection including elements to permit relative rotative movement of the shaft and longitudinally extensible member and to prevent independent longitudinal movement of either thereof, and means connected to said longitudinally extensible member and operative therethrough to raise and lower said shaft.

12. In a tillage implement, a supporting wheel; a longitudinally movable shaft carried by said wheel; a crank arm; a longitudinally extensible member comprising two relatively adjustable parts, one of which is connected to said shaft, the connection including elements to permit relative rotative movement of the shaft and longitudinally extensible member and to prevent independent longitudinal movement of either thereof; a second crank arm extending at an angle to the first crank arm and moved unitarily therewith; a second supporting wheel; an axle carried by the second supporting wheel and provided with a crank arm; and a link connection between the last mentioned crank arm and said second crank arm.

13. In a tillage implement, a supporting wheel, a longitudinally movable shaft carried by said wheel, a bearing element with relation to which the shaft is rotatably mounted but which is held against movement relatively to said shaft in the direction of the length of the shaft, a threaded element pivotally connected to the bearing element, means to hold the threaded element against movement relatively to the shaft in the direction of the length of the shaft, an adjusting element having threads engaging the nut, an element in which the adjusting element is also threaded, and raising and lowering connections provided with a member pivoted to the last mentioned element.

14. In a tillage implement, a supporting wheel, a longitudinally movable shaft carried by said wheel, a bearing element with relation to which the shaft is rotatably mounted but which is held against movement relatively to said shaft in the direction of the length of the shaft, a threaded element pivotally connected to the bearing element, means to hold the threaded element against movement relatively to the shaft in the direction of the length of the shaft, an adjusting element having threads engaging the nut, a first and a second crank arm connected for unitary movement and extending at an angle with each other, an element pivoted to the first crank arm and to which the adjusting element is threaded, a second supporting wheel, its axle, a crank arm projecting from said crank axle, and a link connection between the latter crank arm and the second crank arm.

15. In a tillage implement, a frame, tillage elements carried thereby, a crank axle journaled to the frame upon a horizontal axis and having a spindle at the free end of its crank portion, a land wheel mounted to rotate on said spindle, forward and rearward shafts mounted to have longitudinal movement and to rotate about a substantially vertical axis and having wheel mountings at their lower ends, furrow wheels on said wheel mountings, respectively, a clutch mechanism whose driving member is connected to the land wheel to be rotated thereby, clutch control means, a manually adjustable depth controlling lever, means rigidly connected to the frame to fix the lever to the frame in selected positions, a thrust link whose opposite ends have connection with the driven member of the clutch and with the depth controlling lever respectively, and means connecting the crank axle with the forward furrow wheel shaft to raise and lower the forward furrow wheel shaft by power derived from rotation of the land wheel, including a manually extensible member connected to said forward furrow wheel shaft to adjust the same.

In testimony whereof I affix my signature.

CHARLES T. RAY.